Dec. 5, 1933.  F. M. GINGER ET AL  1,937,755
APPARATUS FOR EXAMINING LIQUIDS
Filed Jan. 10, 1930
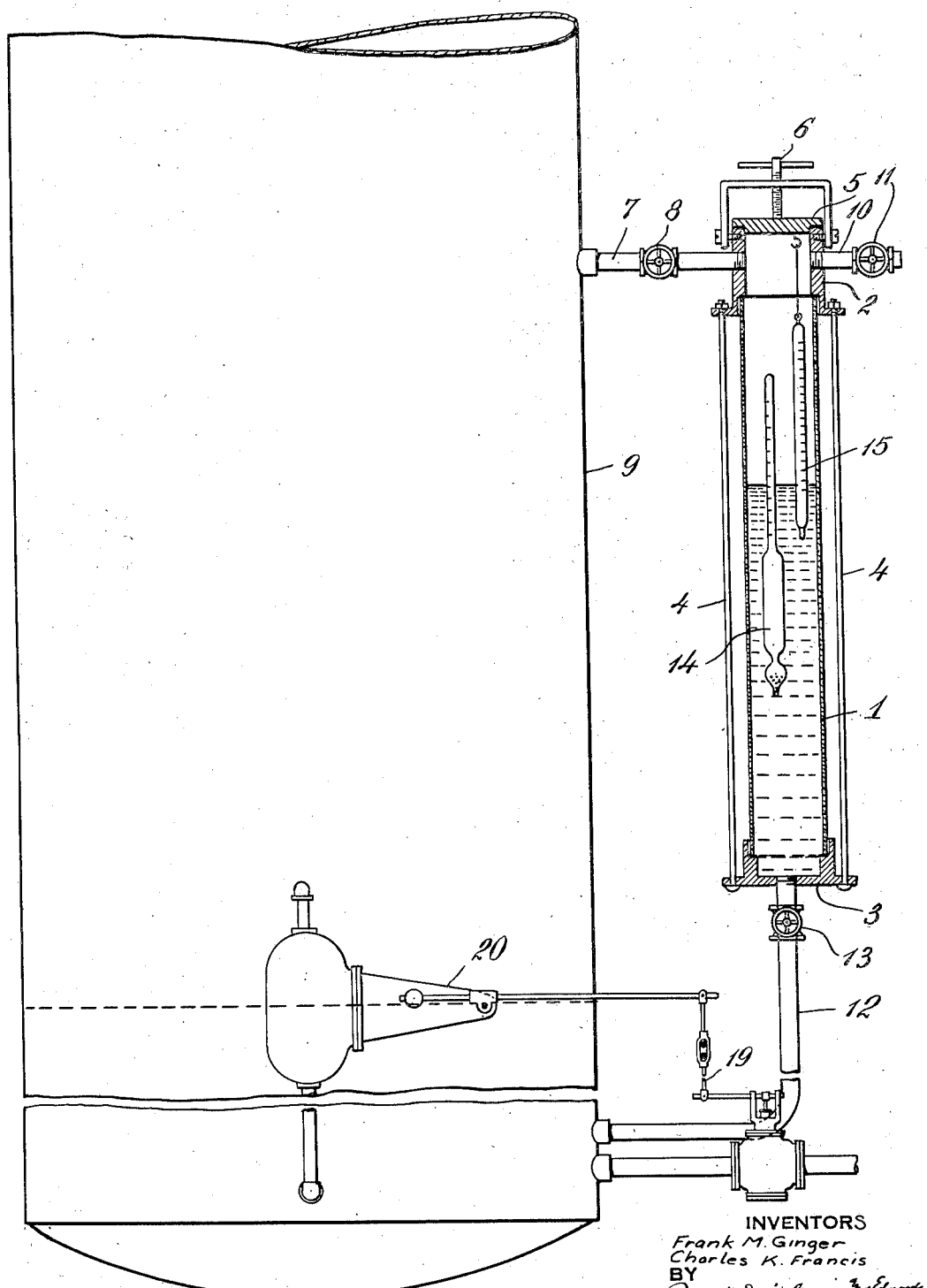
INVENTORS
Frank M. Ginger
Charles K. Francis
BY
ATTORNEYS Patented Dec. 5, 1933

1,937,755

UNITED STATES PATENT OFFICE 1,937,755

APPARATUS FOR EXAMINING LIQUIDS

Frank M. Ginger, Eldorado, Kans., and Charles K. Francis, Tulsa, Okla., assignors to Skelly Oil Company, Wilmington, Del., a corporation of Delaware Application January 10, 1930. Serial No. 419,844

1 Claim. (Cl. 137—21)

This invention provides an improved apparatus for determining the temperature, density, color etc., of liquids in tanks. This apparatus is of special value and application in connection with the handling and storing of petroleum oils but, as will be apparent, it is of more general application.

It is common practice in the petroleum and allied industries to withdraw a sample from a tank or other unit for examination when it is desired to ascertain the temperature, density, color etc., of the liquid in the tank or other unit. The sample taken is then tested, for example for density and for temperature by means of a hydrometer and a thermometer respectively. After the observations have been recorded, the sample is ordinarily discarded and at most must be recovered by a reclaiming process. This method of testing results in considerable loss of liquid and breakage of instruments as well as loss of time.

Because of the present practice in the petroleum industry of maintaining the storage tanks under a slight pressure to overcome "breathing losses", the step of withdrawing the liquid from the tanks becomes in itself a problem involving special apparatus and greater time and care are necessary.

Removal of the more volatile petroleum liquids from their containers introduces a danger because of the tendency of the vapors from these products to form explosive mixtures, and to ignite in the presence of a spark or flame with frequently resulting disastrous fires.

By the use of the apparatus of the present invention all these difficulties are obviated. The liquid in the refining system may be examined without removing the sample from the system. The loss of liquid, time, and instruments and danger of ignition attending customary practice are eliminated. While the present invention is of value in observing the properties of liquid in general, it is especially adapted for observing its temperature and density.

The apparatus of the present invention comprises a glass cylinder, placed in a perpendicular position, connected at top and bottom through valves with the container whose contents are to be examined, and, except for a valved opening at the top, closed to the atmosphere, and an instrument for measuring the properties of the liquid is arranged within the cylinder.

The invention will be further described in connection with the accompanying drawing which illustrates an apparatus embodying the invention.

Referring to the drawing, which shows the apparatus in elevation, the glass cylinder 1 is set in heads 2 and 3, and the whole is held rigid by means of rods 4. The head 2 is provided with a removable cover 5 which is held in place by thumb-screw 6. Pipe 7, provided with valve 8, connects the head 2 with the container 9. Pipe 10, provided with valve 11, opens to the atmosphere. Pipe 12, provided with valve 13, connects the head 3 to the container 9. The cylinder 1 is provided with hydrometer 14, and thermometer 15, the latter suitably suspended. The apparatus 20 is a liquid level control.

When it is desired to make an examination of the contents of container 9, valve 8 is closed and valves 11 and 13 are opened. Due to the slight pressure within the container 9 a portion of its liquid contents passes up through pipe 12 and into the cylinder 1, the valve 13 being closed when the desired level is obtained. Valve 11 is then closed and the readings of density and temperature are taken and examination as to color, etc., is made. When the examination is finished, valves 8 and 13 are opened, whereby the pressure in the cylinder is raised by that in the tank, causing the liquid in the cylinder to run back into the tank.

In the above example the invention is applied to a single container but, if suitable connections are provided, one apparatus may be used to examine the contents of a number of containers. In this way the contents of all the containers of a group may be examined from a central point with resulting saving of time and labor.

If the containers whose contents it is desired to examine are not under pressure, or if it is not feasible to place the glass cylinder above the liquid level in the container, the transfer of the liquid may be effected by proper arrangement of pumps or any other means of forcing the liquid back into the container.

The invention has been described with reference to the petroleum industry, but it will be understood that it may be applied with equal facility to other industries where a similar problem exists, e. g., the tar oil industries, and water treating systems, and such use is within the scope of the present invention.

We claim:

In combination with a tank containing liquids under pressure, apparatus for examining the contents thereof comprising, a closable glass cylinder adapted to receive an instrument for measuring a property of the liquid, arranged above the level of the liquid in the tank, a valved connection from the upper end of the cylinder and adapted to be opened to the atmosphere and a valved connection between the lower end of the cylinder and the tank at a point below the level of the liquid in the tank, whereby liquid may be flowed into the cylinder, and a valved connection between the upper end of the cylinder and the tank at a point above the level of the liquid in the tank whereby the pressure in the cylinder may be raised by that in the tank to permit the liquid in the cylinder to return to the tank.

FRANK M. GINGER.
CHARLES K. FRANCIS.